W. J. BELCHER.
MICROMETER GAGE.
APPLICATION FILED FEB. 19, 1912.
1,169,762.
Patented Feb. 1, 1916.
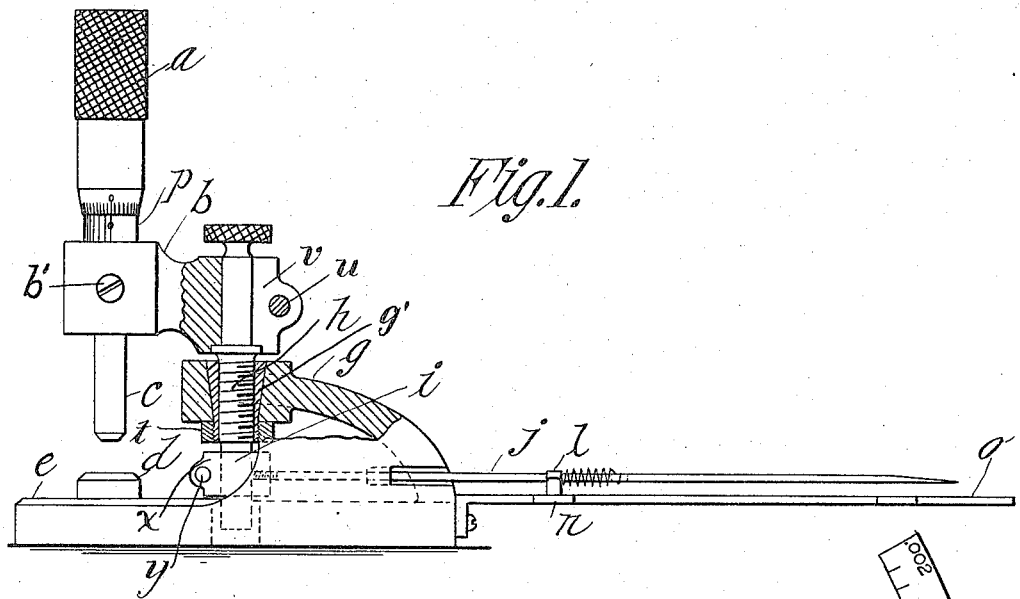
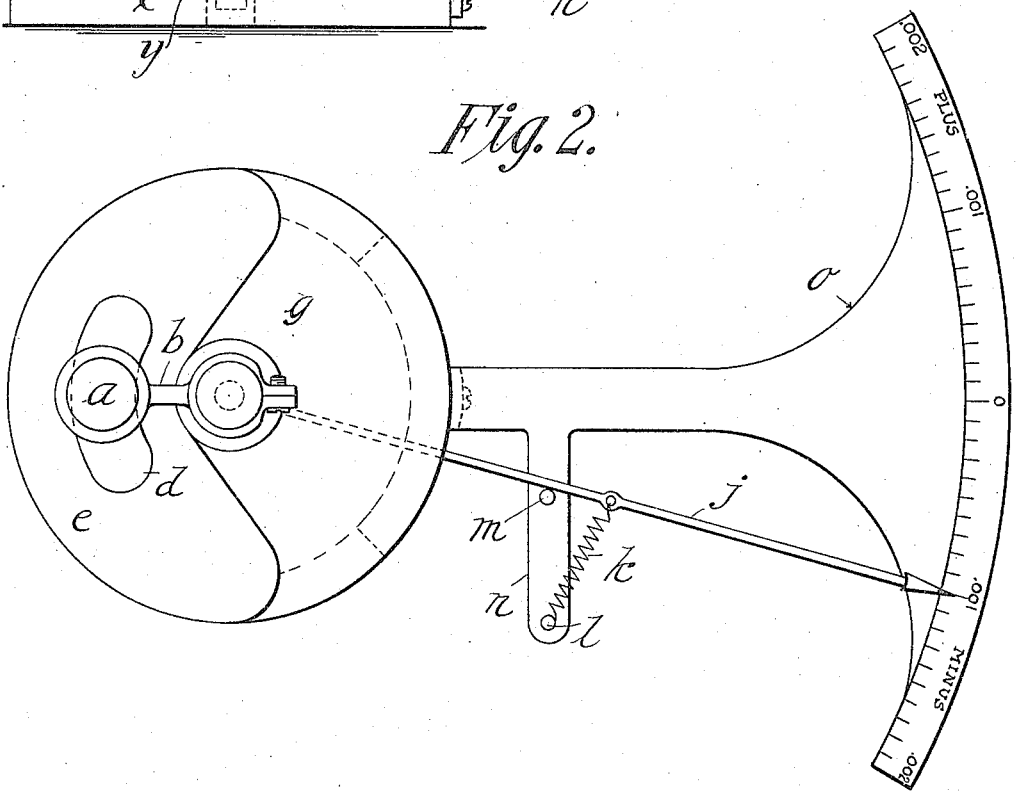
WITNESSES:
Franklin G. Neal
Harry W. Bowen.
INVENTOR,
Warren J. Belcher,
BY Chapin Neal
ATTORNEY.

UNITED STATES PATENT OFFICE.

WARREN J. BELCHER, OF HARTFORD, CONNECTICUT.

MICROMETER-GAGE.

1,169,762.  Specification of Letters Patent.  Patented Feb. 1, 1916.

Application filed February 19, 1912. Serial No. 678,532.

*To all whom it may concern:*

Be it known that I, WARREN J. BELCHER, a citizen of the United States of America, residing at Hartford, in the county of Hartford and State of Connecticut, have invented new and useful Improvements in Micrometer-Gages, of which the following is a specification.

This invention relates to that class of measuring machines in which very small measurements are made with accuracy and speed. Many devices have been patented to make such measurements but they are for the most part complicated and liable to get out of order, and in addition a skilled person must do the work, if satisfactory results are to be obtained.

It is the object of this invention to provide a micrometer gage arranged to enable an unskilled person to make extremely small measurements with accuracy and speed.

Another object of the invention is to provide a measuring instrument using the principle of the well-known micrometer calipering instrument, so arranged that the instrument may be operated by the movement of the part to be measured.

Another object is to provide an instrument where large movements (as compared to the distances measured) of the parts—either the actual measuring parts or the indicating parts, or both—are necessary for extremely small measurements.

Another object of the invention is to provide an instrument of the class above mentioned where a large movement of the measuring part in one direction is required to give a small movement of the measuring part in the same direction as the measurement is being taken.

Another object of the invention is to so combine two micrometer screws that one can be used for one purpose which is related to the purpose of the other in the same machine.

Another object of the invention is to make such a gage in an economical manner, of few parts, and not liable to get out of order when handled by an unskilled person.

While I am aware that ordinary micrometer calipering instruments have been arranged to give multiplied readings of the indicating part, I consider that in the manner of measuring parts either by multiplied movements of the actual measuring part or the indicating parts, or both, as compared to the length being measured no instrument has heretofore been known or used having the functions of the one herewith disclosed.

With these objects in view, a complete understanding of the invention may be had from the following description and accompanying drawings, in which,—

Figure 1 is a side view of the assembled gage with part shown in section to better disclose the structure. Fig. 2 is a plan view of the assembled gage.

The principle of the micrometer caliper is used in this invention. The adaptation of this principle in a novel manner gives the results desired.

The frame $e$ has an anvil $d$ thereon immediately below the movable spindle $c$. The thimble $a$ is mounted, as usual, above and around the sleeve $p$ which is mounted on and supported by an arm $b$. The latter is fastened to the top portion of the micrometer screw $h$ by means of a set screw $u$ and a split portion $v$ in the arm $b$ as clearly indicated in Fig. 1. The support for the screw $h$ is furnished by an overhanging arm $g$ integral with the frame $e$. In the arm $g$ is an externally tapered and interiorly threaded sleeve $g'$, the lower portion thereof passing through the arm $g$ and being secured thereto by a nut $t$, as clearly shown in Fig. 1. The threads on the micrometer screw $h$ engage with the threads on the interior of the member $g'$. Means for taking up the wear on the parts is provided by the tapered member $g'$ and the nut $t$ which operate in an obvious way to perform this function.

In order to obtain a reading of any movement of the screw $h$, a scale $o$ is fastened to the frame $e$ over which a pointer $j$ is arranged to pass. An extension on the lower end of the micrometer screw $h$ provides a part on which one end of the pointer $j$ is made fast by a split sleeve $x$ and a set screw $y$ so that whenever the micrometer screw moves through a small angle, the other end of the pointer $j$ will pass across the scale $o$ through a magnified arc of that angle. Where desired the pointer $j$ can have a normal position to which it will always return after any movement. As shown, this normal position is provided for by the arm $m$ having a stop-pin $l$. One end of a spring $k$ is fast to pin $l$. The other end of the spring $k$ is fastened to the pointer $j$.

The preferred operation is as follows: A master piece of exactly the desired thickness is placed on the anvil $d$. A skilled person sets the gage by bringing the movable spindle $c$ against the master piece with just the right amount of pressure, with the pointer $j$ at zero, after which the movable spindle is fastened in place by a screw $b'$ shown in Fig. 1, and the master piece is removed. An unskilled person may now use the gage. After the spindle $c$ has been set with the pointer at zero, the pointer will be turned to minus .001 by the spring $k$ as soon as it is freed by the operator, in which position it rests against the stop-pin $m$. A part to be measured is placed on the anvil $d$ and slid therealong between it and the spindle $c$. If the part is smaller by less than .001 than the master piece the scale will show how much, for the spindle $c$ is turned a certain distance by the movement of the piece along the anvil and this movement turns the micrometer screw $h$ to raise the spindle $c$ high enough to allow the piece to pass between the anvil and the spindle. The distance through which the micrometer screw $h$ is turned to allow the piece to pass under spindle $c$ is indicated on the scale. If, on the other hand, the part is too large, the scale will indicate the amount, for before the part can pass under the spindle $c$, the micrometer screw $h$ will turn through a certain angle. This movement is in a direction to turn the micrometer screw $h$ to raise said screw through its engagement with the threads in the arm $g$. The arm $b$ and the spindle $c$ are raised at the same time.

It is apparent that the micrometer screw can move through a considerable angle, while raising the spindle $c$ a small distance, and since this angle is read by the movement of the pointer $j$ traveling across a scale at a distance from the axis of the angular movement, accurate micrometric measurements of the distance between the anvil $d$ and the spindle $c$ are readily obtained by any unskilled person.

As an example of the use of the gage consider the following: It is desired to keep certain parts within the limits of one-thousandths of an inch plus, and one-thousandths minus the master piece. The scale $o$ is calibrated to read plus and minus parts of an inch, as indicated in Fig. 2. The pointer $j$ is placed at zero, while the skilled operator sets the movable spindle by the master piece, as described. The spring $k$ then brings the pointer $j$ to minus .001″. Now the unskilled operator may slide the pieces to be gaged under the spindle $c$, as described, throwing out the under sized parts readily, and taking care to see that the pointer moves past plus .001″ on the scale in throwing out the over-sized ones. In this way the work of gaging parts can proceed rapidly.

While applicant has described one form of his invention and the use thereof, other forms of apparatus may embody the invention broadly and any form of the invention can be put to use in measuring instruments of a certain class. Therefore applicant does not desire to limit himself to the specific form and use of the invention described, but wishes the protection defined in the following claims.

What I claim, is:—

1. A measuring instrument comprising, in combination, a micrometer screw, a part having threads which said screw engages, a base, an arm fixed to said screw to swing therewith and over said base, whereby said arm is raised and lowered with respect to the base, all for the purpose described.

2. A measuring instrument comprising, in combination, a micrometer screw, a part having threads which said screw engages, an arm fixed to one end of said screw, another arm fixed to the other end of said screw, both arms arranged to turn with said screw, a base arranged under the end of one arm, and a scale arranged under the second arm, said scale coöperating with said second arm to indicate the distance between the base and the arm above said base.

3. A measuring instrument comprising, in combination, a frame, a micrometer screw engaging threads in a portion of said frame, a scale adjacent the frame, two arms attached to said screw, one adapted to swing over the base of the frame and the other adapted to swing over the scale, said first mentioned arm having mounted therein a micrometer attachment with a spindle movable toward and from the base of the frame, all for the purpose described.

4. A measuring instrument comprising, in combination, a frame, two arms each adapted to receive a micrometer screw, one of said arms being integral with said frame, a micrometer screw for each arm, one arm being fastened to the micrometer screw of the other arm and arranged to swing therewith to raise or lower the end of the spindle of its micrometer screw relative to the base of the frame, as described.

5. A micrometer caliper measuring instrument comprising, in combination, a frame having an anvil thereon, an arm, a movable spindle, sleeve, and thimble all supported by said arm, a second arm having a micrometer screw engaged therein, a threaded support for said micrometer screw, said first arm fixed to the micrometer screw in said second mentioned arm for movement therewith, means locking the movable spindle in said first arm, when desired, to prevent movement relative thereto, said first mentioned arm being arranged to swing over the anvil so that the spindle moves toward and away from said anvil due to the micrometer screw turning in said second arm.

6. A micrometer calipering instrument, comprising, in combination, an anvil, a spindle having a micrometer-screw, a threaded element to receive said screw, an arm carried by and rotatable with the spindle and arranged to be moved toward and from the anvil, a second spindle mounted in said arm and adapted to be moved toward and from the anvil, all constructed and arranged to measure parts between the arm and anvil.

WARREN J. BELCHER.

Witnesses:
GEORGE L. MARSH,
JAS. W. GREEN.

Copies of this patent may be obtained for five cents each, by addressing the "Commissioner of Patents, Washington, D. C."